(12) United States Patent
Kato

(10) Patent No.: US 7,391,284 B2
(45) Date of Patent: Jun. 24, 2008

(54) HIGH-FREQUENCY SWITCH

(75) Inventor: Mitsuhide Kato, Sabae (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 740 days.

(21) Appl. No.: 11/034,278

(22) Filed: Jan. 12, 2005

(65) Prior Publication Data

US 2005/0122184 A1    Jun. 9, 2005

Related U.S. Application Data

(63) Continuation of application No. 10/423,967, filed on Apr. 28, 2003, now Pat. No. 6,897,738, which is a continuation of application No. 09/492,927, filed on Jan. 27, 2000, now Pat. No. 6,633,206.

(30) Foreign Application Priority Data

Jan. 27, 1999   (JP)  ................................ 11-18662

(51) Int. Cl.
*H01P 1/15* (2006.01)
(52) U.S. Cl. ........................................ 333/104; 333/101
(58) Field of Classification Search ................. 333/101, 333/103, 104
See application file for complete search history.

(56) References Cited

U.S. PATENT DOCUMENTS

| | | |
|---|---|---|
| 5,473,293 A | 12/1995 | Chigodo et al. |
| 5,625,894 A | 4/1997 | Jou |
| 5,748,054 A | 5/1998 | Tonegawa et al. |
| 5,783,976 A | 7/1998 | Furutani et al. |
| 5,911,116 A | 6/1999 | Nosswitz |
| 6,289,204 B1 | 9/2001 | Estes et al. |
| 6,633,206 B1 | 10/2003 | Kato |

FOREIGN PATENT DOCUMENTS

| | | |
|---|---|---|
| EP | 0 704 925 A1 | 4/1996 |
| EP | 0 797 312 A2 | 9/1997 |
| JP | 08-162801 | 6/1996 |
| JP | 08-162803 | 6/1996 |

(Continued)

OTHER PUBLICATIONS

Japanese Examination Report dated Jul. 9, 2002, along with English translation of Application JP 11-018662.

(Continued)

*Primary Examiner*—Dean O Takaoka
(74) *Attorney, Agent, or Firm*—Keating & Bennett, LLP

(57) ABSTRACT

A high-frequency switch includes a transmission terminal, an antenna terminal, a reception terminal, and a voltage-control terminal; a first diode, the cathode thereof being electrically connected to the transmission terminal, and the anode being electrically connected to the antenna terminal; a first transmission line, electrically connected between the antenna terminal and the reception terminal; a second diode, the cathode thereof being electrically connected to the reception terminal, and the anode being electrically connected to the voltage-control terminal; a second transmission line, one end thereof being electrically connected to the transmission terminal, and the other end being connected to ground; and a capacitor, electrically connected between the voltage-control terminal and ground. The above high-frequency switch can be miniaturized and has superior performance.

3 Claims, 4 Drawing Sheets

FOREIGN PATENT DOCUMENTS

| | | |
|---|---|---|
| JP | 09-130101 | 5/1997 |
| JP | 09-260901 | 10/1997 |
| JP | 10-056301 | 2/1998 |
| JP | 10-145270 | 5/1998 |
| JP | 10-276003 | 10/1998 |
| JP | 11-17409 | 1/1999 |
| JP | 11-168303 | 6/1999 |
| JP | 11-225088 | 8/1999 |
| WO | WO 96/13101 | 5/1996 |

OTHER PUBLICATIONS

Japanese Examination Report dated Apr. 16, 2002, along with English translation.
European Examination Report dated Oct. 16, 2003.
European Search Report issued on Sep. 9, 2005 in the corresponding European Application No. 05014478.1-2411.

US 7,391,284 B2

HIGH-FREQUENCY SWITCH

This application is a Continuation of U.S. patent aqpplication Ser. No. 10/423,967 filed Apr. 28, 2003 now U.S. Pat. No. 6,897,738, which is a Continuation of U.S. patent application Ser. No. 09/492,927 filed Jan. 27, 2000, now U.S. Pat. No. 6,633,206.

BACKGROUND OF THE INVENTION

1. Field of the Invention

The present invention relates to a high-frequency switch, and more particularly to a high-frequency switch for being incorporated in a mobile communications device and the like.

2. Description of the Related Art

A high-frequency switch is generally used for switching between a transmission circuit and a reception circuit in a digital mobile telephone and the like. FIG. 6 is an electrical circuit diagram showing a prior art high-frequency switch 1. The anode of a diode D1 is connected to a transmission terminal Tx. The anode of the diode D1 is grounded via a series circuit comprising a transmission line 2 and a DC-blocking capacitor C1. A voltage-control terminal Vc1 is connected via a resistor Ra at an intermediate connection point between the transmission line 2 and the capacitor C1. The cathode of the diode D1 connects to an antenna terminal ANT.

A reception terminal Rx is connected to the antenna terminal ANT via a transmission line 3. Moreover, the anode of a diode D2 is connected to the reception terminal Rx. The cathode of the diode D2 is grounded.

Here, the DC-blocking capacitor C1, connected between the transmission line 2 and the ground, has a large capacitance (approximately 47 pF near 1 GHz, and approximately 22 pF near 2 GHz). Since the size of the capacitor C1 connected between the transmission line 2 and ground is large, miniaturization of the high-frequency switch 1 is hindered.

Furthermore, in the high-frequency switch 1, when the transmission terminal Tx and the antenna terminal ANT are connected, isolation must be maintained between the antenna terminal ANT and the reception terminal Rx. When this isolation is poor, insertion loss between the transmission terminal Tx and the antenna terminal ANT increases.

SUMMARY OF THE INVENTION

The present invention provides a high-frequency switch which overcomes the above described problems, being small-scale and having superior performance.

One preferred embodiment of the present invention provides a high-frequency switch comprising:

a transmission terminal, an antenna terminal, a reception terminal, and a voltage-control terminal;

a first diode, the cathode thereof being electrically connected to said transmission terminal, and the anode being electrically connected to said antenna terminal;

a first transmission line, electrically connected between said antenna terminal and said reception terminal;

a second diode, the cathode thereof being electrically connected to said reception terminal, and the anode being electrically connected to said voltage-control terminal;

a second transmission line, one end thereof being electrically connected to said transmission terminal, and the other end being connected to ground; and a capacitor, electrically connected between said voltage-control terminal and ground.

With the above constitution, there is no need for the conventional large-capacitance capacitor which was connected on the transmission terminal side, and it is sufficient to connect only a small-capacitance capacitor on the reception terminal side. Therefore, the high-frequency switch can be miniaturized.

In the above described high-frequency switch, said transmission terminal, said reception terminal, said antenna terminal, and said voltage-controlled terminal may be provided on the surface of a multilayered body; said multilayered body being formed by laminating a plurality of dielectric layers, said first and second transmission lines, a capacitor electrode of said capacitor and a ground electrode; and said first and second diodes may be mounted on said multilayered body. Alternatively, the capacitor may be mounted on the surface of the multilayered body, instead of being contained in the multilayered body.

According to the constitution described above, a high-frequency switch is obtained having a multilayered structure wherein the circuit is contained within a single component.

Other features and advantages of the present invention will become apparent from the following description of embodiments of the invention which refers to the accompanying drawings.

DESCRIPTION OF PREFERRED EMBODIMENTS

Embodiment 1

FIG. 1 to FIG. 3

Figure 1:
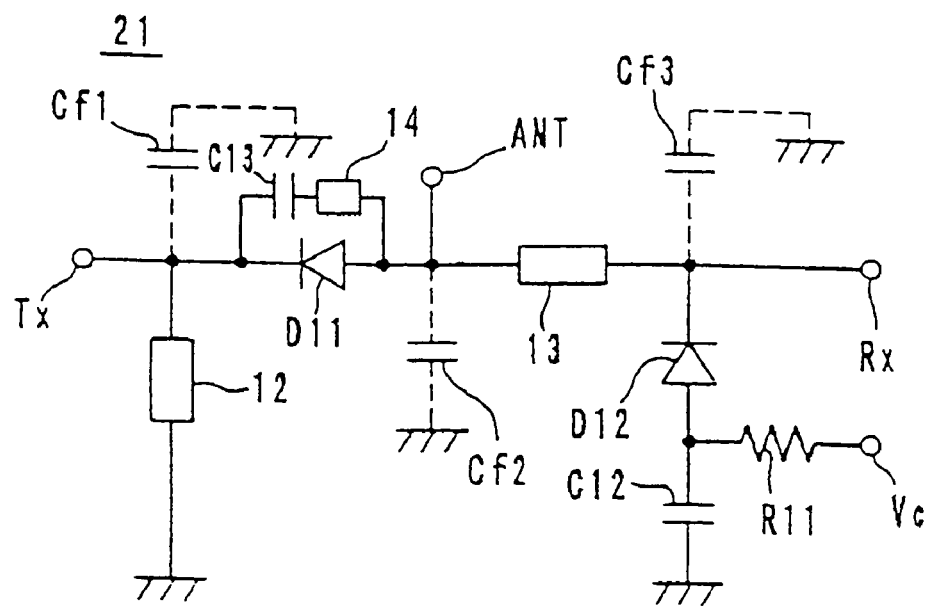
FIG. 1 is an electrical circuit diagram showing a first embodiment of a high-frequency switch according to the present invention.

FIG. 1 is an electrical circuit diagram showing an example of a high-frequency switch 21 according to the present invention. The cathode of a diode D11, forming a switching element, is connected to a transmission terminal Tx. The cathode of the diode D11 is grounded via a transmission line 12. The transmission line 12 functions as a choke element. In addition, the anode of the diode D11 connects to an antenna terminal ANT.

A reception terminal Rx is connected via a transmission line 13 to the antenna terminal ANT. Moreover, the cathode of a diode D12 connects to the reception terminal Rx. The anode of the diode D12 connects to the ground via a DC-blocking capacitor C12. A voltage-control terminal Vc connects via a resistor R11 to an intermediate connection point between the diode D12 and the capacitor C12. A control circuit (not shown) is connected to this voltage-control terminal Vc, and switches the transmission lines of the high-frequency switch 21.

A series circuit, comprising a transmission line 14 and a capacitor C13, connects to both ends of the diode D11 (between the anode and the cathode). The transmission line 14 and the capacitor C13 are provided in order to achieve good isolation when the diode D11 is in the OFF state.

Here, distributed constant lines having a characteristic impedance of more than 40 Ω or high-frequency inductors, are used as the transmission lines 12 and 13. When distributed constant lines are used, the lengths of the transmission lines 12 and 13 are set within a range of greater than $\lambda/12$ and less than $\lambda/4$ (where $\lambda$ is the wavelength of a desired frequency). A distributed constant line or a high-frequency inductor is also used for the transmission line 14. Furthermore, floating capacitances Cf1, Cf2, and Cf3 are generated between the terminals Tx, ANT, Rx, and ground, and can function as bypass capacitors for impedance adjustment.

Next, transmitting and receiving using this high-frequency switch 21 will be explained. When a positive potential has been applied to the voltage-control terminal Vc, this potential provides a forward bias voltage for the diodes D11 and D12. Therefore, the diodes D11 and D12 switch to the ON state. Since direct current is blocked by the capacitor C12, the voltage supplied to the voltage-control terminal Vc is applied to the circuit comprising the diodes D11 band D12.

As a result, a transmission signal which has entered the transmission terminal Tx passes through the diode D11, and is sent to the antenna terminal ANT. At this time, most of the transmission signal is not sent to the reception terminal Rx. This is because the self-inductance of the diode D12 in the ON state and the capacitance of the capacitor C12 resonate in series at the transmission frequency, whereby the impedance is 0. That is, the transmission lines 12 and 13 operate as a short-stub of length $\lambda/4$, and consequently the transmission terminal Tx and the antenna terminal ANT are connected, and the reception terminal Rx is grounded.

Furthermore, when the voltage-control terminal Vc is at ground potential, the diodes D11 and D12 switch OFF. Therefore, there is a cut-off between the transmission terminal Tx and the antenna terminal ANT, and in addition, there is a cut-off between the reception terminal Rx and ground. As a result, a received signal which has entered the antenna terminal ANT is sent through the transmission line 13 to the reception terminal Rx, and is mostly not transmitted to the transmission terminal Tx.

In this way, by controlling the bias voltage applied to the voltage-control terminal Vc, the high-frequency switch 21 is able to switch between the respective transmission paths of transmitted and received signals.

Figure 6:
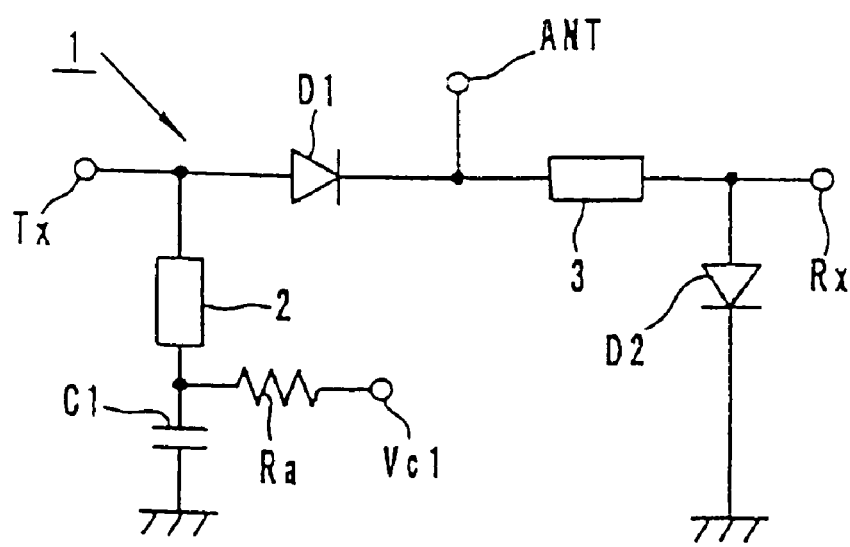
FIG. 6 is an electrical circuit diagram showing a prior art high-frequency switch.

Moreover, by connecting the cathodes and anodes of the diodes D11 and D12 in the reverse arrangement to that of the cathodes and anodes of the diodes D1 and D2 of the conventional high-frequency switch 1 shown in FIG. 6, the high-frequency switch 21 can dispense with the large-capacitance and large-scale DC-blocking capacitor C1 of the conventional high-frequency switch 1. That is, the high-frequency switch 21 requires only the small-capacitance and small-scale capacitor C12, connected between the diode D12 and ground on the reception terminal Rx side. The capacitance of the capacitor C12 is, for instance, 10 pF near 1 GHz, and 3 pF near 2 GHz. Consequently, the high-frequency switch 21 can be miniaturized.

Furthermore, by adjusting the capacitance of the capacitor C12, the isolation between the antenna terminal ANT and the reception terminal Rx, which is especially important when the transmission terminal Tx and the antenna terminal ANT are connected, can be increased more than in the conventional high-frequency switch. As a result, it is possible to reduce insertion loss between the transmission terminal Tx and the antenna terminal ANT.

Moreover, when transmitting (when the diode D12 is in the ON state), the voltage-control terminal Vc is shorted to ground, and when receiving (when the diode D12 is in the OFF state), the voltage-controlled terminal Vc is cut-off from the high-frequency signal by the high impedance of the diode D12, and consequently, it is possible to achieve a large isolation between the control circuit connected to the voltage-control terminal Vc and the high-frequency signal.

And, as shown in FIG. 1, a series circuit comprised of a capacitor C13 and a transmission line 14 may be connected to the diode D11 in parallel. In this case, the self-inductance of the diode D11 and the inductance of the transmission line 14 form a parallel resonance circuit. By matching the resonant frequency thereof with the frequency of the signal, the impedance at the connection point of the diode D11 and the transmission line 14 is increased when the diode D11 is in the ON state, and thereby the insertion loss and the reflection loss are reduced. The capacitor C13 is provided for blocking the direct current via the transmission line 14.

Figure 2:
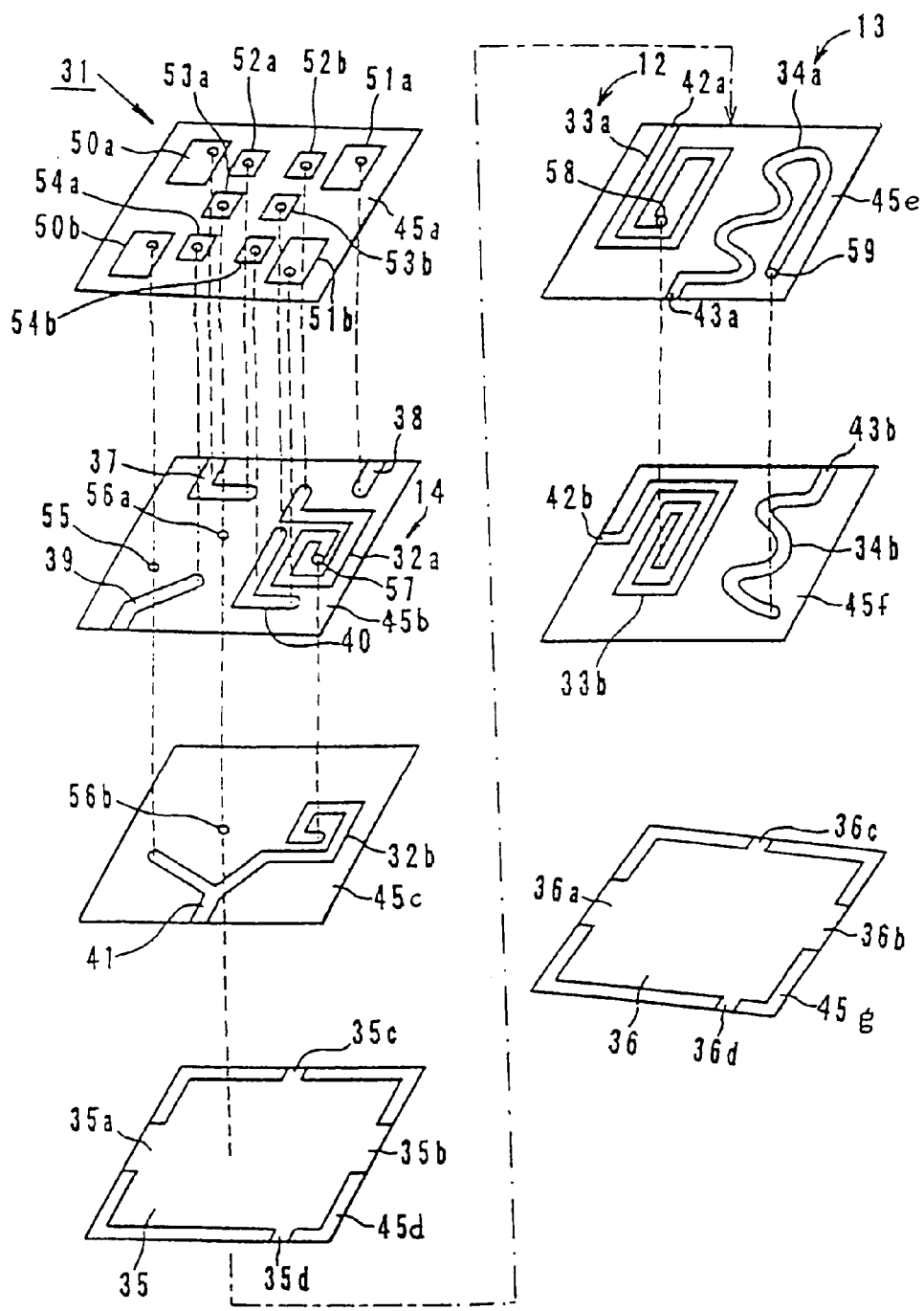
FIG. 2 is an exploded perspective view of a multilayered high-frequency switch having the electrical circuit shown in FIG. 1.

Next, an example of a laminated-type high-frequency switch having the electrical circuit shown in FIG. 1 will be explained with reference to FIG. 2 and FIG. 3. As shown in FIG. 2, the high-frequency switch 31 comprises dielectric sheets 45*b* and 45*c* respectively provided with distributed constant lines 32*a*, 32*b* and the like, dielectric sheets 45*d* and 45*g* respectively provided with wide-area ground electrodes 35 and 36, dielectric sheets 45*e* and 45*f* respectively provided with distributed constant lines 33*a*, 34*a* and 33*b*, 34*b*, a dielectric sheet 45*a* provided with peer-hole pads 50*a* to 54*b*, etc.

The distributed constant lines 33*a* and 33*b* are for instance spiral-shaped, and are provided on the left side of the sheets 45*e* and 45*f*. The extracted portion 42*a* of the distributed constant line 33*a* is exposed on the far side near the left side of the sheet 45*e*, and the extracted portion 42*b* of the distributed constant line 33*b* is exposed on the left side of the sheet 45*f*. The distributed constant lines 33*a* and 33*b* are electrically connected in series via a peer-hole 58, provided in the sheet 45*e*, and form the transmission line 12.

The distributed constant lines 34*a* and 34*b* are substantially meander-shaped, and are provided on the right side of the sheets 45*e* and 45*f*. The extracted portion 43*a* of the distributed constant line 34*a* is exposed in the center on the front side of the sheet 45*e*, and the extracted portion 43*b* of the distributed constant line 34*b* is exposed near the right side on the far side of the sheet 45*f*. The distributed constant lines 34*a* and 34*b* are electrically connected in series via a peer-hole 59, provided in the sheet 45*e*, and form the transmission line 13.

The distributed constant lines 32*a* and 32*b* are spiral-shaped, and are provided on the right side of the sheets 45*b* and 45*c*. The distributed constant lines 32*a* and 32*b* are electrically connected in series via a peer-hole 57, provided in the sheet 45*b*, and form the transmission line 14. In this way, transmission lines 12 to 14 having fixed impedance characteristics each comprise two layers and comprise distributed constant lines 33*a*, 33*b*, 34*a*, 34*b*, 32*a*, and 32*b*, whereby the length of a transmission line portion on each one layer can be shorter than in the conventional art. Therefore, the size of the sheets 45*a*-45*g* can be reduced, obtaining a high-frequency switch 31 which occupies a small area with respect to a printed circuit substrate or the like.

The ground electrodes 35 and 36 are provided over a wide area on the surfaces of the sheets 45d and 45g. The extracted portions 35a and 36a of the ground electrodes 35 and 36 are exposed on the left sides of the sheets 45d and 45g, the extracted portions 35b and 36b are exposed on the right, the extracted portions 35c and 36c are exposed in the center on the far sides of the sheets 45d and 45g, and the extracted portions 35d and 36d are exposed near the right side on the front sides of the sheets 45d and 45g. The transmission lines 12 and 13 are provided in parallel between these two ground electrodes 35 and 36.

Moreover, extracted electrodes 37, 38, 39, and a relay electrode 40 are provided on the surface of the sheet 45b on which the distributed constant line 32a is provided. Ends of each of the extracted electrodes 37 and 38 are exposed near the left side and right side on the far side of the sheet 45b, and the end of the extracted electrode 39 is exposed near the left side on the front side of the sheet 45b. Then, the distributed constant line 32a is electrically connected to a peer-hole pad 52b, the extracted electrode 37 is electrically connected to-peer-hole pads 50a and 52a, the extracted electrode 38 is electrically connected to a peer-hole pad 51a, and the relay electrode 40 is electrically connected to peer-hole pads 53b, 54b, and 51b.

An extracted electrode 41 is provided on the surface of the sheet 45c on which the distributed constant line 32b is provided. One end of the extracted electrode 41 is exposed in the center of the front side of the sheet 45c. Then, the extracted electrode 41 is electrically connected to the distributed constant line 32b, and in addition, electrically connected via the peer-hole 55 to the peer-hole pad 50b. Furthermore, the peer-hole pad 53a is electrically connected to the ground electrode 35 via the peer-holes 56a and 56b provided in the sheets 45b and 45c.

Figure 3:
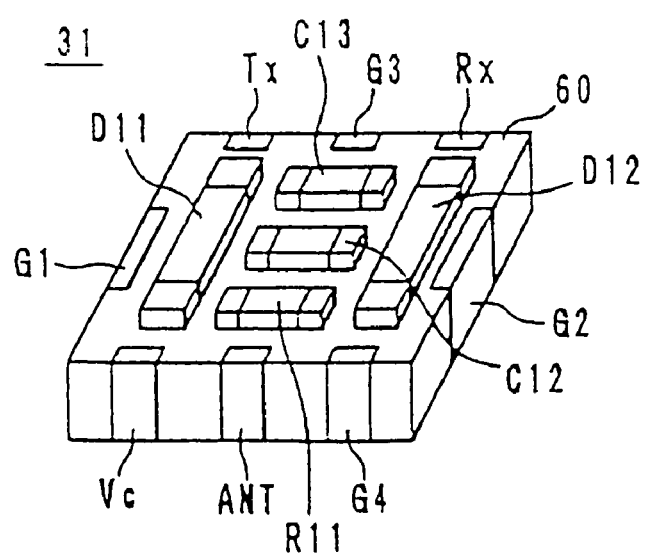
FIG. 3 is a perspective view of the exterior of the high-frequency switch shown in FIG. 2.

When all the sheets 45a-45g having the above constitutions are piled on top of each other and heat-bonded together, the multilayered body 60 shown in FIG. 3 is obtained. A transmission terminal Tx, a ground terminal G3, and a reception terminal Rx are provided on the left side, the center, and the right side of the side face portion on the far side of the multilayered body 60. A voltage-control terminal Vc, an antenna terminal ANT, and a ground terminal G4 are provided on the left side, the center, and the right side of the side face portion on the front side of the multilayered body 60. Ground terminals G1 and G2 are provided on the left and right side face portions of the multilayered body 60.

The transmission terminal Tx is electrically connected to one end of the transmission line 12 (specifically, to the extracted portion 42a of the distributed constant line 33a), and to the extracted electrode 37. The reception terminal Rx is electrically connected to one end of the transmission line 13 (specifically, to the extracted portion 43b of the distributed constant line 34b), and to the extracted electrode 38. The antenna terminal ANT is electrically connected to the other end of the transmission line 13 (specifically, to the extracted portion 43a of the distributed constant line 34a), and to the extracted electrode 41. The voltage-control terminal Vc is electrically connected to the extracted electrode 39. The ground terminal G1 is electrically connected to the other end of the transmission line 12 (specifically, the extracted portion 42b of the distributed constant line 33b), and to the extracted portions 35a and 36a of the ground electrodes 35 and 36. The ground terminals G2, G3, and G4 are electrically connected respectively to the extracted portions 35b, 36b, 35c, 36c, 35d, and 36d of the ground electrodes 35 and 36.

Moreover, the cathode electrode and anode electrode of the diode D11 are soldered to the pads 50a and 50b on the multilayered body 60, the cathode electrode and anode electrode of the diode D12 are soldered to the pads 51a and 51b, the terminal electrodes of the capacitor C13 are soldered to the pads 52a and 52b, the terminal electrodes of the capacitor C12 are soldered to the pads 53a and 53b, and the terminal electrodes of the resistor R11 are soldered to the pads 54a and 54b.

This obtains a surface mount-type multilayered high-frequency switch 31 having the electrical circuit shown in FIG. 1. This multilayered high-frequency switch 31 does not require a large-capacitance DC-blocking capacitor C1, as in the conventional high-frequency switch 1 shown in FIG. 6, to be incorporated in or mounted on the multilayered body 60, and consequently even though the transmission lines 12 to 14 each comprise two layers, the number of layers in the multilayered body 60 can be reduced. Moreover, the size of the sheets 45a-45g can be reduced, reducing the area occupied by the high-frequency switch 31 on a printed circuit substrate or the like.

Furthermore, in the high-frequency switch 1 shown in FIG. 6, a resistor Ra (an external component) was electrically connected at an intermediate connection point between the transmission line 2 and the capacitor C1, causing complex interconnections. By contrast, in the high-frequency switch 31, since one end of the transmission line 12 connects to the ground terminal G1, interconnection is simple, thereby enabling the number of layers in the multilayered body 60 to be reduced, and leading to a consequent improvement in transmission loss by eliminating unnecessary coupling.

Embodiment 2

FIG. 4 and FIG. 5

Figure 4:
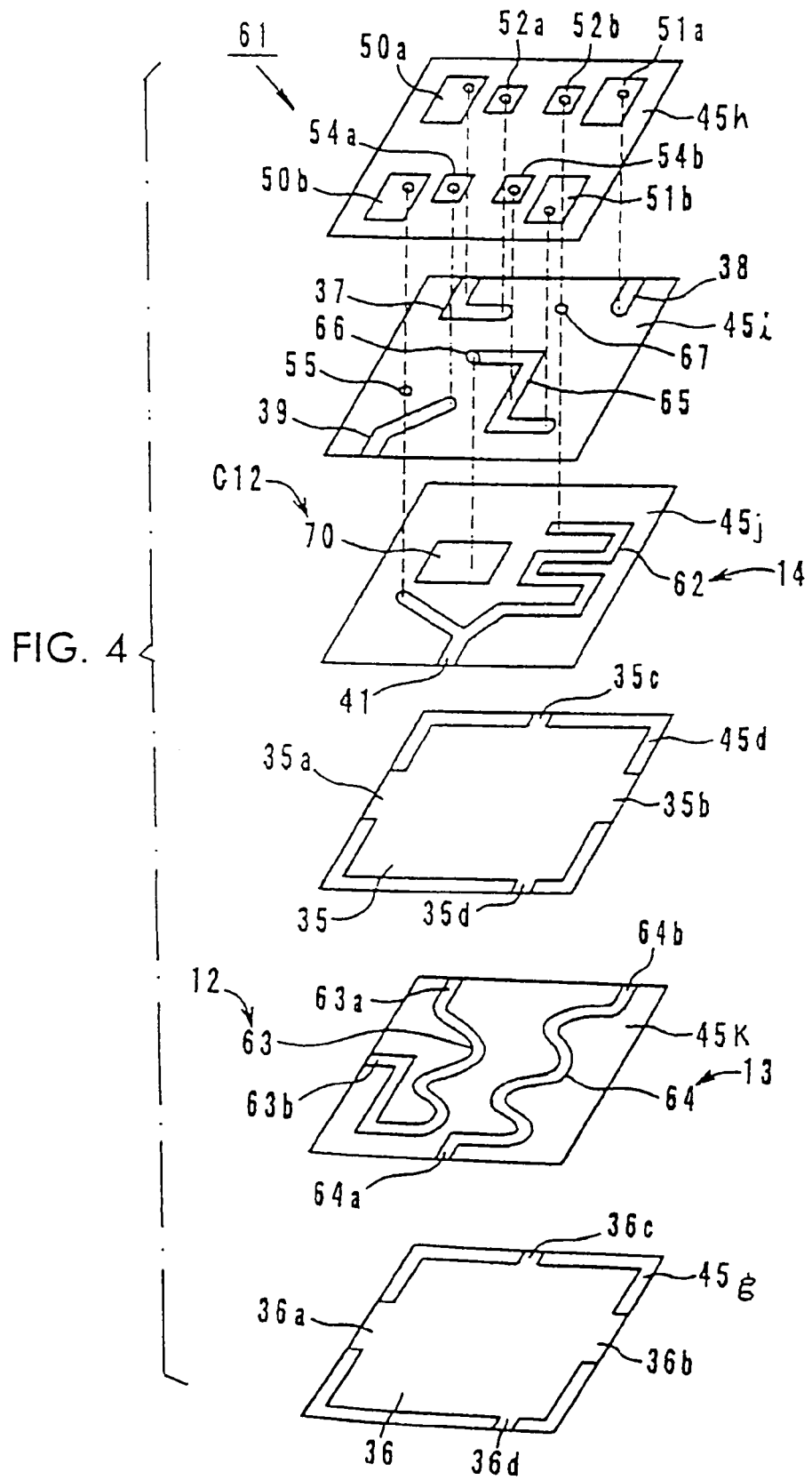
FIG. 4 is an exploded perspective view of a second embodiment of a high-frequency switch according to the present invention.
Figure 5:
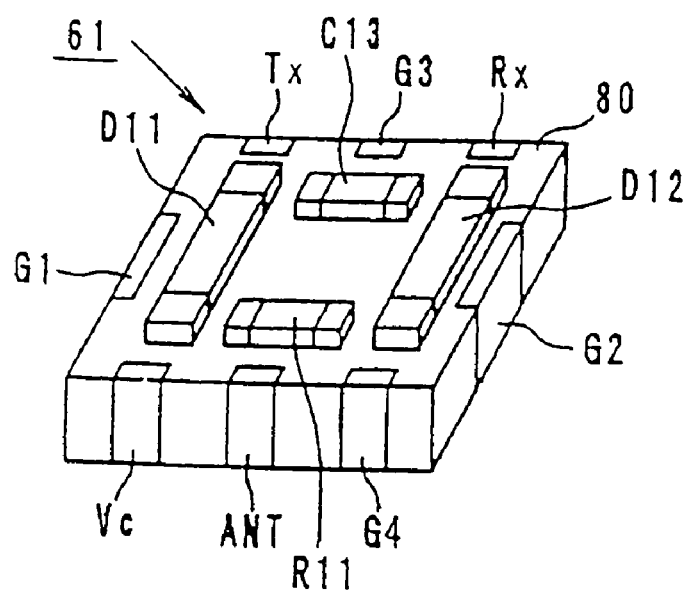
FIG. 5 is an external perspective view of the high-frequency switch shown in FIG. 4.

Another example of a multilayered high-frequency switch having the electrical circuit shown in FIG. 1 will be explained referring to FIG. 4 and FIG. 5. The high-frequency switch 61 of this second embodiment contains a DC-blocking capacitor C12 within its multilayered body. In FIGS. 4 and 5, the same parts as those in FIGS. 2 and 3 are represented by the same reference numerals, and explanation thereof is omitted.

As shown in FIG. 4, the high-frequency switch 61 comprises a dielectric sheet 45j; comprising a distributed constant line 62 and a capacitor electrode 70, dielectric sheets 45d and 45g comprising wide-area ground electrodes 35 and 36, a dielectric sheet 45k comprising distributed constant lines 63 and 64, a dielectric sheet 45i; comprising extracted electrodes 37 and 38 and the like, a dielectric sheet 45h comprising peer-hole pads 50a and 50b and the like, etc.

The distributed constant line 62 is for instance meander-shaped, and forms a transmission line 14. One end of the distributed constant line 62 is electrically connected to the extracted electrode 41, and the other end is electrically connected to the peer-hole pad 52b via a peer-hole 67, provided in the sheet 45i. The distributed constant lines 63 and 64 are substantially meander-shaped, and respectively form transmission lines 12 and 13. One extracted portion 63a of the distributed constant line 63 is exposed near the left side on the far side of the sheet 45k, and the other extracted portion 63b is exposed the left side of the sheet 45k. One extracted portion 64a of the distributed constant line 64 is exposed in the center of the front side of the sheet 45k, and the other extracted portion 64b is exposed near the right side on the far side of the sheet 45k. In this way, since the transmission lines 12 to 14 each comprise one-layer distributed constant lines 63, 64, and 62 respectively, the number of layers of the multilayered body 80 (explained later) can be further reduced.

The capacitor electrode 70 is formed on the sheet 45j on the side thereof away from the ground electrode 35, and together with the ground electrode 35 forms a capacitor C12. The capacitor electrode 70 electrically connects via a peer-hole 66 to the relay electrode 65 provided on the sheet 45i. Moreover, the relay electrode 65 is electrically connected to the peer-hole pads 51b and 54b.

When the sheets 45d and 45g-45k of the above constitution are piled on top of each other and heat-bonded together, the multilayered body 80 as shown in FIG. 5 is obtained. A transmission terminal Tx, a ground terminal G3, and a reception terminal Rx are provided on the side face portion at the far side of the multilayered body 80. A voltage-control terminal Vc, an antenna terminal ANT, and a ground terminal G4 are provided on the side face portion at the front side of the multilayered body 80. Ground terminals G1 and G2 are provided on the left and right side face portions of the multilayered body 80.

The transmission terminal Tx is electrically connected to the extracted portion 63a of the distributed constant line 63, and to the extracted electrode 37. The reception terminal Rx is electrically connected to the extracted portion 64a of the distributed constant line 64, and to the extracted electrode 38. The antenna terminal ANT is electrically connected to the extracted portion 64a of the distributed constant line 64, and to the extracted electrode 41. The voltage-control terminal Vc is electrically connected to the extracted electrode 39. The ground terminal G1 is electrically connected to the extracted portion 63b of the distributed constant line 63, and to the extracted portions 35a and 36a of the ground electrodes 35 and 36. The ground terminals G2, G3, and G4 are electrically connected to the extracted portions 35b, 36b, 35c, 36c, 35d, and 36d of the ground electrodes 35 and 36 respectively.

Moreover, the cathode electrode and anode electrode of the diode D11 are soldered to the pads 50a and 50b on the multilayered body 80, the cathode electrode and anode electrode of the diode D12 are soldered to the pads 51a and 51b, the terminal electrodes of the capacitor C13 are soldered to the pads 52a and 52b, and the terminal electrodes of the resistor R11 are soldered to the pads 54a and 54b.

This obtains a surface mount-type multilayered high-frequency switch 61 having the electrical circuit shown in FIG. 1. Since the capacitor C12 has a small capacitance, the area of the capacitor electrode 70 is smaller and it occupies less area when incorporated in the multilayered body 80. Therefore, the high-frequency switch 61 can be more miniaturized than a conventional one.

Moreover, in the high-frequency switch 61, since the capacitor C12 is contained in the multilayered body 80, the length of the interconnection from the capacitor C12 to ground is shorter than when the capacitor C12 is mounted on the multilayered body as an external component. Therefore, there is less residual impedance, improving the DC bias-blocking effect. Moreover, the value of the capacitor C12 can be minutely adjusted by changing the size of the capacitor electrode 70, a greater isolation can be achieved between the antenna terminal ANT and the reception terminal Rx when the transmission terminal Tx and the antenna terminal ANT are connected than in a conventional high-frequency switch, and there is a reduction in insertion loss between the transmission terminal Tx and the antenna terminal ANT.

Other Embodiments

The high-frequency switch according to the present invention is not restricted to the embodiments described above, and various modifications can be made thereto within the scope of its main features.

For instance, in the high-frequency switch 21 shown in FIG. 1, the series circuit comprising the transmission line and the capacitor may be connected to both ends (between the anode and the cathode) of the diode D12. Alternatively, capacitors may be connected in parallel to both ends (between the anode and the cathode) of the diodes D11 and D12, in parallel with the series circuit comprising the transmission line and the capacitor, improving the isolation when the diodes D11 and D12 are OFF. Furthermore, resistances (greater than 10K Ω) may be connected in parallel to both ends of the diodes D11 and D12, in order to stabilize the voltage when a reverse bias is applied.

Furthermore, in the above embodiments, since a DC bias is applied to the terminals Tx, Rx, and ANT, a separate coupling capacitor for DC bias-blocking may be connected to these terminals Tx, Rx and ANT as required.

As is clear from the above explanation, according to the present invention, by making the direction of the cathode and anode of the diode the reverse of that in a conventional high-frequency switch, the conventional large-scale and large-capacitance DC-blocking capacitor connected in the transmission terminal side becomes unnecessary, and it is only necessary to connect a small-scale and small-capacitance DC-blocking capacitor in the reception terminal side. Therefore, the high-frequency switch can be miniaturized.

Furthermore, by adjusting the capacitance of this small-scale capacitor, a greater isolation between the antenna terminal and the reception terminal can be obtained than in a conventional high-frequency switch. Therefore, insertion loss between the transmission terminal and the antenna terminal can be reduced. Moreover, when transmitting, the voltage-control terminal is shorted to ground, and when receiving, the voltage-control terminal is cut-off from the high-frequency signal by the high impedance of a second diode, and consequently, a large isolation can be achieved between the control circuit connected to the voltage-control terminal and the high-frequency signal. As a result, it is possible to obtain a high-frequency switch of superior performance.

While the invention has been particularly shown and described with reference to preferred embodiments thereof, it will be understood by those skilled in the art that the foregoing and other changes in form and details may be made therein without departing from the spirit of the invention.

What is claimed is:
1. A high-frequency switch comprising:
a transmission terminal, an antenna terminal, a reception terminal, and a single voltage-control terminal;
a first diode, the cathode thereof being electrically connected to said transmission terminal, and the anode being electrically connected to said antenna terminal;
a first transmission line, electrically connected between said antenna terminal and said reception terminal;
a second diode, the cathode thereof being electrically connected to said reception terminal, and the anode being electrically connected to said single voltage-control terminal;
a second transmission line, one end thereof being electrically connected to said transmission terminal, and the other end being connected to ground without a DC-blocking capacitor; and a capacitor, electrically connected between said single voltage-control terminal and ground, and the capacitor being connected to said second diode in series;

wherein a self-inductance of said second diode in an ON state and a capacitance of said capacitor resonate in series at a transmission frequency.

2. The high-frequency switch according to claim 1, wherein said transmission terminal, said reception terminal, said antenna terminal, and said voltage-control terminal are provided on an outside surface of a multilayered body;

said multilayered body comprises a plurality of laminated dielectric layers, having electrodes thereon, said electrodes constituting said first and second transmission lines, a capacitor electrode of said capacitor and a ground electrode; and said first and second diodes are mounted on said outside surface of said multilayered body and connected to said electrodes.

3. The high-frequency switch according to claim 1, wherein said transmission terminal, said reception terminal, said antenna terminal, and said voltage-control terminal are provided on an outside surface of a multilayered body;

said multilayered body comprises a plurality of laminated dielectric layers having electrodes thereon, said electrodes constituting said first and second transmission lines;

and said first and second diodes are mounted on said outside surface of said multilayered body and connected to said electrodes.

* * * * *